Nov. 9, 1948.                    H. L. RENKEN                    2,453,384
                        AUTOMATIC WINDROWER FOR BALERS
Filed Aug. 17, 1945                                      2 Sheets-Sheet 1
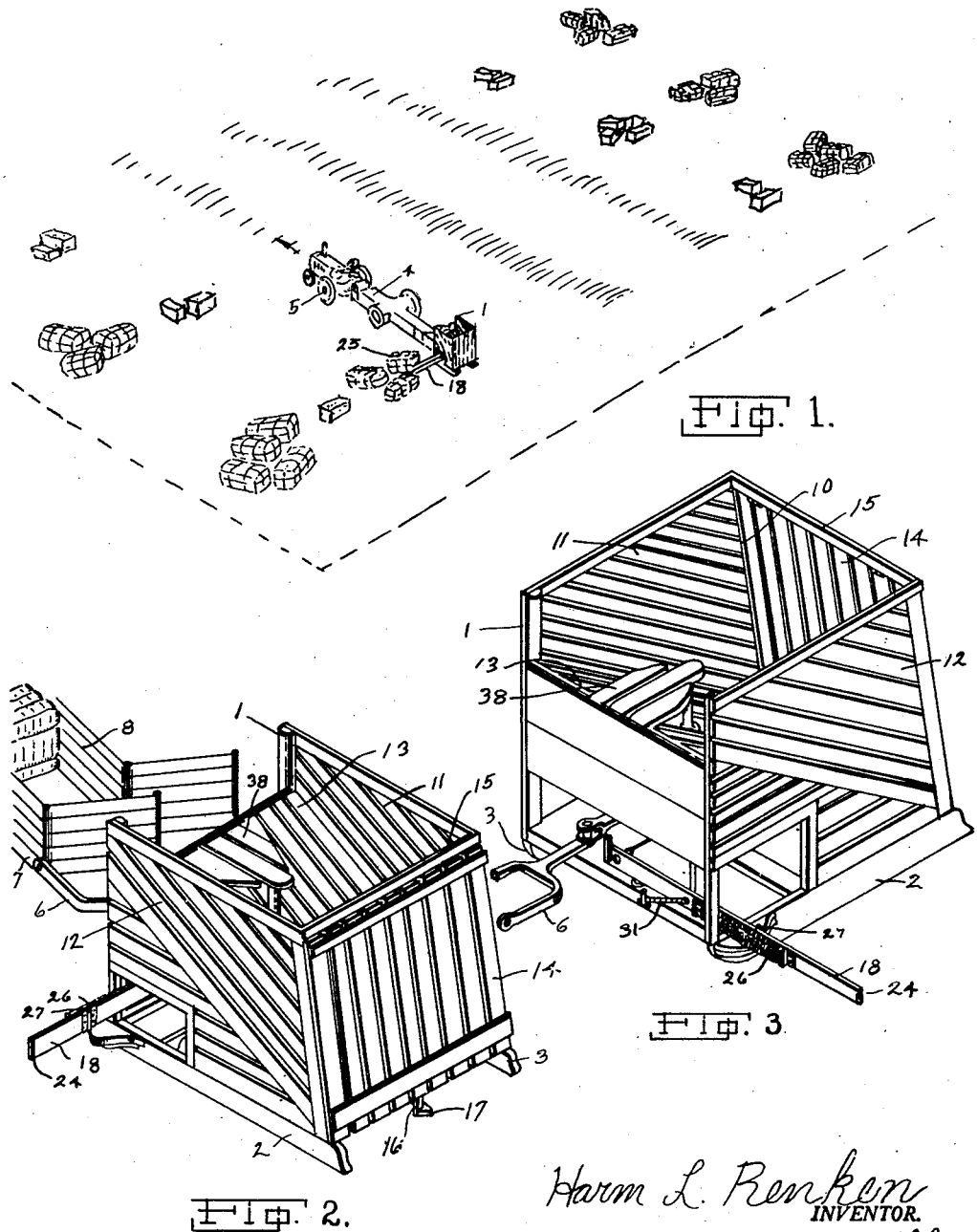

Nov. 9, 1948.   H. L. RENKEN   2,453,384
AUTOMATIC WINDROWER FOR BALERS

Filed Aug. 17, 1945   2 Sheets—Sheet 2

Harm L. Renken
INVENTOR.
BY: W.B. McCall.
Atty.

Patented Nov. 9, 1948

2,453,384

UNITED STATES PATENT OFFICE 2,453,384

AUTOMATIC WINDROWER FOR BALERS

Harm L. Renken, Pleasant Plains, Ill., assignor of one-fourth to Kenneth Stringfield, Pleasant Plains, Ill.

Application August 17, 1945, Serial No. 610,907

1 Claim. (Cl. 214—65)

My invention relates to portable hoppers and has to do with means for receiving and discharging selected quantities of bales of hay, straw and the like.

A further object of my invention is to provide an automatic windrower for balers and especially for a pick up type of baler.

A further object of my invention is to provide as a new article of manufacture, a portable hopper for receiving and dumping bales of hay, straw and the like, wherein the hopper is drawn by a tractor behind a pick up baler and detachably connected to the rear terminal of the baler in position permitting the bales coming from the baler to be forced up into the hopper until a predetermined number of bales have accumulated in the hopper, at which time the bales may be automatically or optionally dumped from the hopper.

A particular purpose of my invention is to provide an automatic windrower for balers, wherein the bale hopper is provided with a laterally projecting dumping lever which is controllably connected with a trigger hook that normally holds the rear dumping gate of the hopper in a locked condition so that as the baler is drawn along through the field, it may dump the hopper of bales into a predetermined place in the field by permitting the dumping lever to strike a bale that has already been dumped.

I attain the objects of my invention by the implement described in this specification, recited in the claims and illustrated in the accompanying drawings, wherein:

Figure 1 is a perspective of a field showing the relative operating positions of a tractor, a baler, and my automatic windrower for balers as they move past bales that have been dumped in a windrow.

Figure 2 is a perspective of the rear and side portion of my invention.

Figure 3 is a perspective of a front and side portion of my invention.

Figure 4:
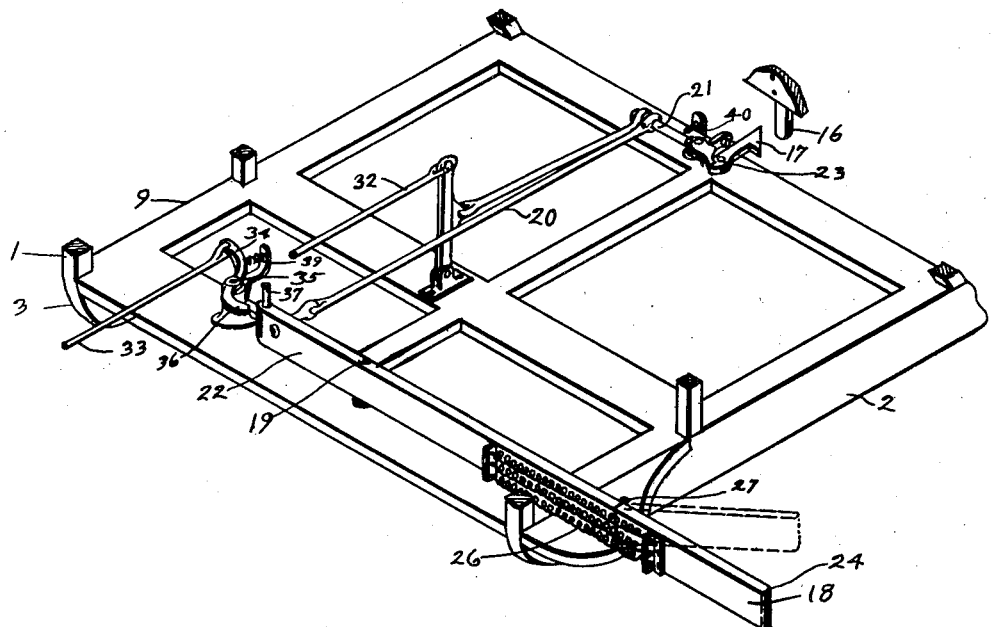
Figure 4 is a perspective of a horizontal section through the hopper frame disclosing the operative connection of the controlling mechanism thereof.
Figure 5:
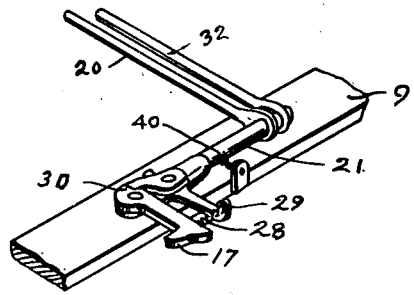
Figure 5 is a perspective of the preferred type of trigger hook used in conjunction with my automatic windrower for balers.

I shall now describe my invention and its outstanding merits as I refer to the drawings which comprehensively disclose the operating features thereof.

It is true that there have been certain types of bale carriers made which were adapted to receive and carry bales from a baler so that they might be released manually at selected places; but in my invention, I am providing a most practical and convenient means for automatically dumping a number of bales in windrows as a pick up baler is driven around the field of hay, clover and the like, and I thus achieve this result by a full size working model of my machine which I have been using in the field in recent weeks with a wide and growing interest in the same among practical agricultural experts.

In my invention which can be made either of metal or wood, I shall describe certain mechanical features with reference to the drawing which illustrates wood construction merely to disclose an operative structure and to this end I provide as my invention in an automatic windrower for balers a hopper frame 1 made portable either by using runners 2 and 3 or wheels (not shown) for its portable support.

This hopper frame 1 is pulled in the field behind a baler 4 which in turn is pulled by a tractor 5; while the simple and practical means of detachably securing this hopper frame 1 to baler 4 is by a yoke 6 secured to the rear terminal 7 of the bale discharge chute 8.

Hopper frame 1 has a bottom structure 9 which operatively supports the effective mechanism of my device.

A bale receiving hopper is defined by downwardly and rearwardly sloping side walls 11 and 12; by a downwardly and rearwardly sloping bottom 13 and a downwardly and rearwardly sloping dumping end gate 14 that is hingedly hung at the top 15 to swing outward in releasing bales from hopper 10.

This end gate 14 is provided with a bottom central latch member 16 adapted to be secured by a hook 17 supported by bottom 9 of frame 1. This hook 17 is made and operably connected up to release bales automatically from hopper 10 but is also connected up to permit an optional release of such bales.

In order to make it more convenient to load bales on trucks or wagons in the field it is thought best to arrange the bales on the ground in what is known to farmers as windrows, and in this invention I am providing means for automatically releasing a hopper full of bales into a windrow by an operation wherein a pivoted side tripping arm or dumping arm 18 strikes a bale already lying on the ground in a windrow and automatically releases hook 17 from latch member 16 permitting dumping end gate 14 to swing out at the bottom and let all the bales slide out of hopper 10 onto the ground.

This automatic operation is achieved by my invention in a manner wherein dumping arm 18 being pivotally anchored on upright pin 19 is connected by rod or wire or rope 20 to trigger hook releasing arm 21 from short end 22 of this dumping arm 18; and since hook 17 is pivoted on pin 23 on bottom 9 of frame 1 then dumping arm 18 will release hook 17 from its engagement with latch member 16 when ever the free end 24 of arm 18 strikes a bale 25 on the ground alongside of hopper frame 1.

It will be noted that spring members 26 bridging across the hinge joint 27 of arm 18 should be of greater tensile strength than the tensile pull required on release member 20 so that hook 17 will be promptly released from its hold on latch pin 16 when arm terminal 24 strikes a bale 25.

Hook 17 with its arm 21 will function in a practical way, but in order to make the resilient pivoted action of this hook more certain I am providing an independent movement of hook 17 against spring 28 on bracket 29, while release arm 21 is connected by an abutting contact against integral lug portion 30 of hook 17 so that arm 21 can always function to release hook 17 either automatically or optionally and yet when end dumping gate 14 swings back into place this free action of hook 17 accelerated by spring 28 will make hook 17 always catch and hold latch pin 16 to hold gate 14 in locked position.

Hinge 27 permits free end 24 of arm 18 to turn or swing back until it passes a bale 25 that has dumped the bales out of hopper 10.

A spring 31 urges arm 18 always back to its forward position ready for its next bale contact.

There will obviously be times when it is desired to dump bales out of hopper 10 most any place in the field where it is selected and when this is desired the tractor driver will pull on rope 32 establishing connection between the driver's position at the tractor and release arm 21 of hook 17 to release bales from hopper 10.

In the meantime there may often be situations wherein it may not be desired to dump the bales from hopper 10 even when arm terminal 24 of arm 18 is about to strike a bale that would dump the hopper.

In this case the tractor driver will pull on rope 33 connected to one end of hook 34 which is pivotally supported on pin 35, with the result that the free hook end 36 thereof will engage pin 37 of arm 18 holding arm 18 in fixed position so that it cannot release dumping hook 17 to let out the bales from hopper 10. When thus holding arm 18 from movement then in striking a bale with terminal 24 of arm 18, this terminal merely breaks back hingedly to release itself from the bale contact and springs back in place without dumping the hopper 10.

It will be seen that I provide an elevated receiving platform 38 at the front of hopper 10 for receiving bales from bale chute 3 of baler 4 and from this platform the bales fall to the left and right into hopper 10.

It will be noted that spring 39 holds hook 34 normally away from pin 37, while spring 40 of release arm 21 normally urges this arm rearwardly.

Having thus described the nature of my invention, what I claim is:

An automatic windrower for balers comprising a portably mounted bale receiving hopper; means for detachably securing said hopper to the rear terminal of a "pick up" baler; said hopper being provided with an elevated platform for receiving bales from said baler terminal and having a downwardly and rearwardly sloping bottom wall, side walls and a rear terminal gate, the latter hanging from a hinged support at its top, a locking pin fixed centrally on the bottom free end of said gate and a trigger hook mounted on said hopper frame for automatic engagement and disengagement with said pin, a dumping lever pivoted to the forward bottom portion of said hopper frame and having a short end controllably connected with said trigger hook and a long end extending substantially outward from the side of said hopper, said long end having a terminal portion hinged for rearward swing, spring means for urging said terminal section to a straight position, a pivoted lever hook adjacent the short end of said dumping lever for optionally stopping said dumping lever from functioning to release said trigger hook from holding said rear dumping gate, a remote control connection extending from said trigger hook lever to a position adjacent a tractor drive position when pulling a baler with said automatic windrower behind the baler, and a second remote control means establishing connection between said lever hook and said tractor driver's position for optionally holding said dumping lever from functioning to dump bales from said hopper, when desired.

HARM L. RENKEN.

No references cited.